United States Patent
Alipoor et al.

(10) Patent No.: US 12,542,445 B2
(45) Date of Patent: Feb. 3, 2026

(54) CHARGE/DISCHARGE CONTROL METHOD OF BATTERY STORAGE SYSTEM

(71) Applicant: DIAMOND&ZEBRA ELECTRIC CO., LTD., Osaka (JP)

(72) Inventors: Jaber Alipoor, Osaka (JP); Yasuhiro Fukui, Osaka (JP)

(73) Assignee: DIAMOND&ZEBRA ELECTRIC CO., LTD., Osaka (JP)

( * ) Notice: Subject to any disclaimer, the term of this patent is extended or adjusted under 35 U.S.C. 154(b) by 730 days.

(21) Appl. No.: 17/872,977

(22) Filed: Jul. 25, 2022

(65) Prior Publication Data

US 2023/0023119 A1    Jan. 26, 2023

(30) Foreign Application Priority Data

Jul. 26, 2021    (JP) ................................. 2021-121452

(51) Int. Cl.
*H02J 7/00*    (2006.01)
*H02J 7/02*    (2016.01)

(52) U.S. Cl.
CPC ........ *H02J 7/0025* (2020.01); *H02J 7/00712* (2020.01); *H02J 7/02* (2013.01)

(58) Field of Classification Search
CPC .................................................... H02J 7/0025
USPC ......................................................... 320/128
See application file for complete search history.

(56) References Cited

U.S. PATENT DOCUMENTS

| | | | | |
|---|---|---|---|---|
| 9,041,355 B2* | 5/2015 | Ishibashi | ................. | B60L 58/15 |
| | | | | 320/136 |
| 9,201,118 B2* | 12/2015 | Uchida | ................ | G01R 31/382 |
| 2011/0273130 A1* | 11/2011 | Lee | ......................... | H02S 40/32 |
| | | | | 320/101 |
| 2014/0015537 A1* | 1/2014 | Uchida | ................ | G01R 31/382 |
| | | | | 324/434 |
| 2022/0190619 A1* | 6/2022 | Fasching | ............. | H01M 10/443 |

FOREIGN PATENT DOCUMENTS

| | | |
|---|---|---|
| JP | 2006129585 A | 5/2006 |
| JP | 2009213288 A | 9/2009 |
| JP | 2012-95418 A | 5/2012 |
| JP | 2015204652 A | 11/2015 |
| JP | 2018-019579 A | 2/2018 |

OTHER PUBLICATIONS

JP Office Action dated Jun. 3, 2025 as received in Application No. 2021-121452.

* cited by examiner

*Primary Examiner* — Yalkew Fantu
(74) *Attorney, Agent, or Firm* — Maschoff Brennan (57) ABSTRACT

In a power conditioner system including a storage system having a plurality of battery units, the battery units of the storage system are each connected to an inverter through a DC link. A battery unit executing charge/discharge operation for controlling the voltage of the DC link is selected among the battery units.

3 Claims, 7 Drawing Sheets

CHARGE/DISCHARGE CONTROL METHOD OF BATTERY STORAGE SYSTEM

CROSS-REFERENCE TO RELATED APPLICATIONS

This application claims priority to Japanese Patent Application No. 2021-121452 filed on Jul. 26, 2021. The entire disclosure of this application is incorporated by reference herein.

BACKGROUND

The present disclosure relates to a technology for controlling charge/discharge in a storage system including a plurality of battery units.

With the widespread proliferation of distributed power supply devices such as a solar photovoltaic system and a wind power generation system, a power conditioner system provided with a storage battery is becoming widespread for stabilization of the system, as a supply-demand adjustment force, and in preparation for a long-term power failure caused by a disaster. Also, with decrease in the cost of battery units, demand for using a power conditioner system including a plurality of battery units is growing.

Japanese Unexamined Patent Publication No. 2012-95418 discloses a DC feeding system that stabilizes the voltage of a DC bus to which DC power supply devices are connected. In this DC feeding system, when the voltage supplied from a distributed power supply device to the DC bus falls below a predetermined voltage, a controller controlling a plurality of converters controls the converters so as to supply power from one DC power supply device to the DC bus and supply power from the DC bus to another DC power supply device.

In a conventional power conditioner system, an inverter of a power conditioner controls the voltage of a DC link to which distributed power supplies are connected so as to stabilize the voltage. However, in the event of receiving an instruction of power restriction from a commercial power system, or in the event of abrupt fluctuation of the power consumption of a load, for example, the inverter may find difficulty in controlling the voltage of the DC link in some cases.

An objective of the present disclosure is achieving charge/discharge control of a storage system for stabilizing the voltage of a DC link in a power conditioner system that includes a storage system having a plurality of battery units.

SUMMARY

According to one mode of the present disclosure, a method for controlling charge/discharge of a plurality of battery units in a power conditioner system is provided, the power conditioner system including a storage system having the plurality of battery units each connected to an inverter through a DC link. The method includes selecting, among the plurality of battery units, at least one first battery unit that executes charge/discharge operation for controlling a voltage of the DC link.

According to the present disclosure, in a storage system having a plurality of battery units, charge/discharge control for stabilizing the voltage of a DC link can be achieved.

DETAILED DESCRIPTION

According to one mode of the present disclosure, a method for controlling charge/discharge of a plurality of battery units in a power conditioner system, the power conditioner system including a storage system having the plurality of battery units each connected to an inverter through a DC link is provided. The method includes selecting, among the plurality of battery units, at least one first battery unit that executes charge/discharge operation for controlling a voltage of the DC link.

With the above configuration, the power conditioner system includes a storage system having a plurality of battery units. The battery units are each connected to an inverter through a DC link. A first battery unit executing charge/discharge operation for controlling the voltage of the DC link is selected among the plurality of battery units. Therefore, even in the event that control of the voltage of the DC link by the inverter becomes difficult, the voltage of the DC link can be stabilized by the charge/discharge operation of the first battery unit. Also, since every battery unit other than the first battery unit can execute charge/discharge operation for electric power control, the charge/discharge power of the entire storage system can be properly managed. Thus, in the storage system including a plurality of battery units, charge/discharge control for stabilizing the voltage of the DC link can be achieved.

In the above mode, the method may include making the first battery unit execute the charge/discharge operation for controlling the voltage of the DC link; and making every battery unit other than the first battery unit execute charge/discharge operation with given charge/discharge power.

With the above configuration, the voltage of the DC link can be stabilized by the charge/discharge operation of the first battery unit, and also the charge/discharge power of the entire storage system can be properly managed by the charge/discharge operation of every battery unit other than the first battery unit.

Further, the method may include: computing total charge/discharge power to be allocated to the storage system; allocating the computed total charge/discharge power to the battery units; and selecting the first battery unit among the plurality of battery units.

With the above configuration, the total charge/discharge power to be allocated to the storage system is computed, and the computed total charge/discharge power is allocated to the battery units. Among the battery units, the first battery unit executing the charge/discharge operation for controlling the voltage of the DC link is selected. It is therefore possible to stabilize the voltage of the DC link while properly managing the charge/discharge power of the entire storage system.

In the above mode, the selection of the first battery unit may be performed using at least either one of parameters concerning power and energy of the battery units.

With the above configuration, the first battery unit executing the charge/discharge operation for controlling the voltage of the DC link can be properly selected.

Furthermore, in the above mode, a battery unit other than the first battery unit may be made to execute the charge/discharge operation for controlling the voltage of the DC link when the voltage of the DC link exceeds a predetermined upper limit value or falls below a predetermined lower limit value.

With the above configuration, when the voltage of the DC link exceeds the upper limit value or falls below the lower limit value, another battery unit is used, in addition to the first battery unit, to execute the charge/discharge operation for controlling the voltage of the DC link. It is therefore possible to further stabilize the voltage of the DC link.

Also, in the above mode, the method may include: computing total charge/discharge power to be allocated to the storage system; allocating the computed total charge/discharge power to the battery units; and selecting the first battery unit among the plurality of battery units using at least either one of parameters concerning power and energy of the battery units.

With the above configuration, the total charge/discharge power to be allocated to the storage system is computed, and the computed total charge/discharge power is allocated to the battery units. Among the battery units, the first battery unit executing the charge/discharge operation for controlling the voltage of the DC link is properly selected. It is therefore possible to stabilize the voltage of the DC link while properly managing the charge/discharge power of the entire storage system.

An embodiment of the present disclosure will be described hereinafter with reference to the accompanying drawings. It is to be noted that the following description of the preferred embodiment is essentially a mere illustration and by no means intended to restrict the present disclosure, the range of application thereof, or the uses thereof.

Embodiment

Figure 1:
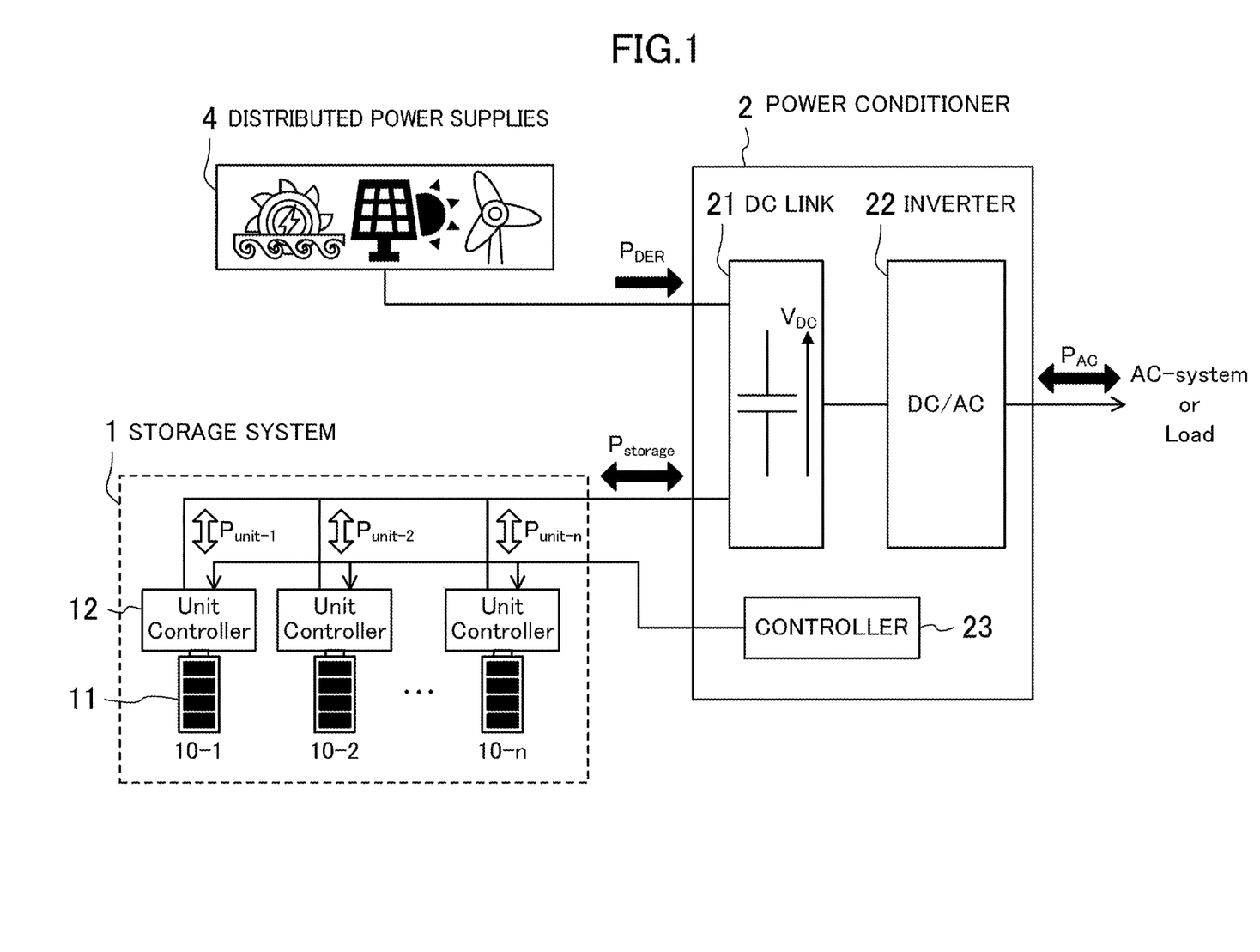
FIG. 1 shows an example of the entire configuration of a power conditioner system including a storage system.

FIG. 1 shows an example of the entire configuration of a power conditioner system including a storage system. In FIG. 1, a storge system 1 includes n (n is a positive integer) chargeable/dischargeable battery units 10-1, 10-2, . . . , 10-n. Note that hereinafter the battery units 10-1, 10-2, . . . , 10-n are collectively called the battery units 10 in some cases. The battery units 10 each include a storage battery 11 and a unit controller 12. A power conditioner 2 includes a DC link 21 connected with the battery units 10 of the storage system 1, an inverter 22 that converts DC power from the DC link 21 into AC power, and a controller 23 that controls charge/discharge operation of the battery units 10 of the storage system 1. The controller 23 is implemented by a microcomputer provided with a processor and memory, for example. The unit controller 12 of each of the battery units 10 includes a bidirectional DC/DC converter (not shown), and executes charge/discharge of its storage battery 11 in accordance with a signal sent from the controller 23 of the power conditioner 2. Also, the unit controller 12 of each battery unit 10 includes a voltage sensor for measuring the voltage VDC of the DC link.

Distributed power supplies 4 include a solar photovoltaic system, a hydroelectric system, and a wind power generation system, for example. The distributed power supplies 4 are connected to the DC link 21 and output electric power $P_{DER}$. Output electric power $P_{AC}$ of the power conditioner 2 is supplied to a commercial power system and a load.

The controller 23 of the power conditioner 2 computes charge/discharge power $P_{storage}$ of the storage system 1 every given cycle. For example, when the output power $P_{DER}$ of the distributed power supplies 4 is greater than the output power $P_{AC}$ of the power conditioner 2, the surplus power is taken as the charge power $P_{storage}$ of the storage system 1. On the other hand, when the output power $P_{DER}$ of the distributed power supplies 4 decreases under the influence of a weather condition, etc., causing a power shortage for the output power $P_{AC}$ of the power conditioner 2, the shortage of power is taken as the discharge power $P_{storage}$ of the storage system 1.

The inverter 22 of the power conditioner 2 controls the voltage $V_{DC}$ of the DC link 21 so as to stabilize the voltage $V_{DC}$. However, when an instruction of power restriction is received from a commercial power system, or when the power consumption of a load abruptly varies, for example, the control of the voltage VDC of the DC link 21 may become difficult in some cases.

To address the above problem, in this embodiment, the storage system 1 provided with a plurality of battery units 10 is made to control the voltage $V_{DC}$ of the DC link 21. With this, the voltage $V_{DC}$ of the DC link 21 can be further stabilized even when the inverter 22 of the power conditioner 2 finds difficulty in properly controlling the voltage $V_{DC}$ of the DC link 21.

A problem as follows will arise, however, if all the battery units 10 of the storage system 1 are used to control the voltage $V_{DC}$ of the DC link 21. That is, the values of the voltage VDc measured in the battery units 10 are slightly different from one another in some cases, and also the voltage sensors of the battery units 10 may have measurement errors. For this reason, while some battery units 10 may attempt to raise the voltage $V_{DC}$ of the DC link 21, other battery units 10 may attempt to reduce the voltage $V_{DC}$, causing a possibility of occurrence of charge/discharge among the battery units 10.

Also, in order for the storage system 1 having a plurality of battery units 10 to exert its charge/discharge capabilities stably for a longer time period, charge/discharge power assigned to each of the battery units 10 must be properly managed. For example, when the states of charge (SOCs) of the battery units 10 are different from one another, it is preferable to assign charge/discharge power to each of the battery units 10 so that the SOCs be converged at the same timing.

Figure 2:
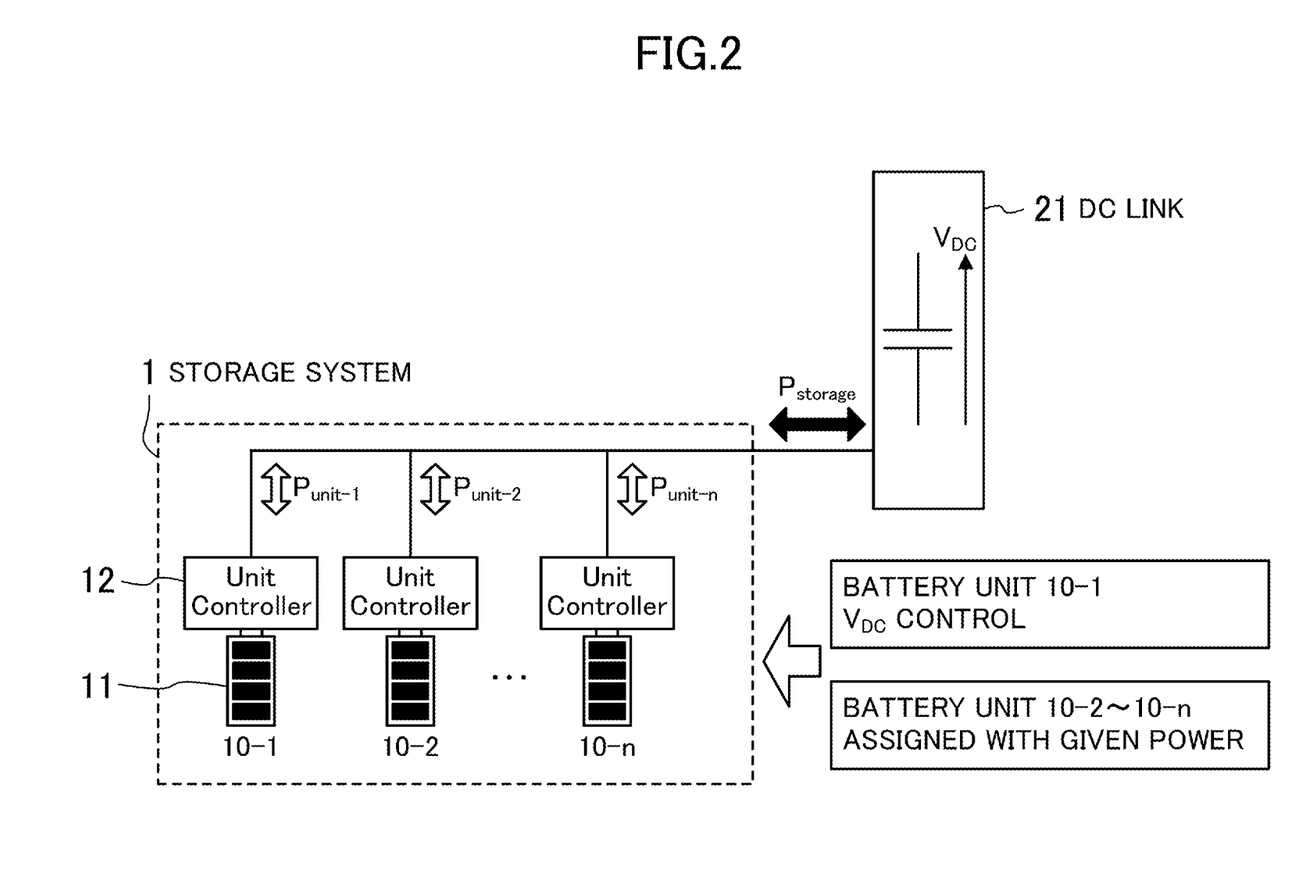
FIG. 2 is a conceptual diagram showing roles of battery units in an embodiment.

In this embodiment, therefore, as shown in FIG. 2, at least one battery unit 10 is selected, among the plurality of battery units 10, as the battery unit 10 controlling the voltage $V_{DC}$ of the DC link 21. In FIG. 2, the battery unit 10-1 is selected as the battery unit controlling the voltage $V_{DC}$ of the DC link 21. The selected battery unit 10-1 executes charge/discharge operation for stabilizing the voltage $V_{DC}$ of the DC link 21. For example, the battery unit 10-1 performs charge operation when the voltage $V_{DC}$ is higher than a given reference value, and performs discharge operation when the voltage $V_{DC}$ is lower than a given reference value. On the other hand, the other battery units 10-2 to 10-n are assigned with respective given charge/discharge power.

As a result, the voltage $V_{DC}$ of the DC link 21 can be further stabilized, and also the storage system 1 having a plurality of battery units 10 can exert its charge/discharge capabilities stably for a longer time period. Such charge/discharge control of the battery units 10 is executed every cycle of computation of the charge/discharge power $P_{storage}$ of the storage system 1 by the controller 23.

Figure 3:
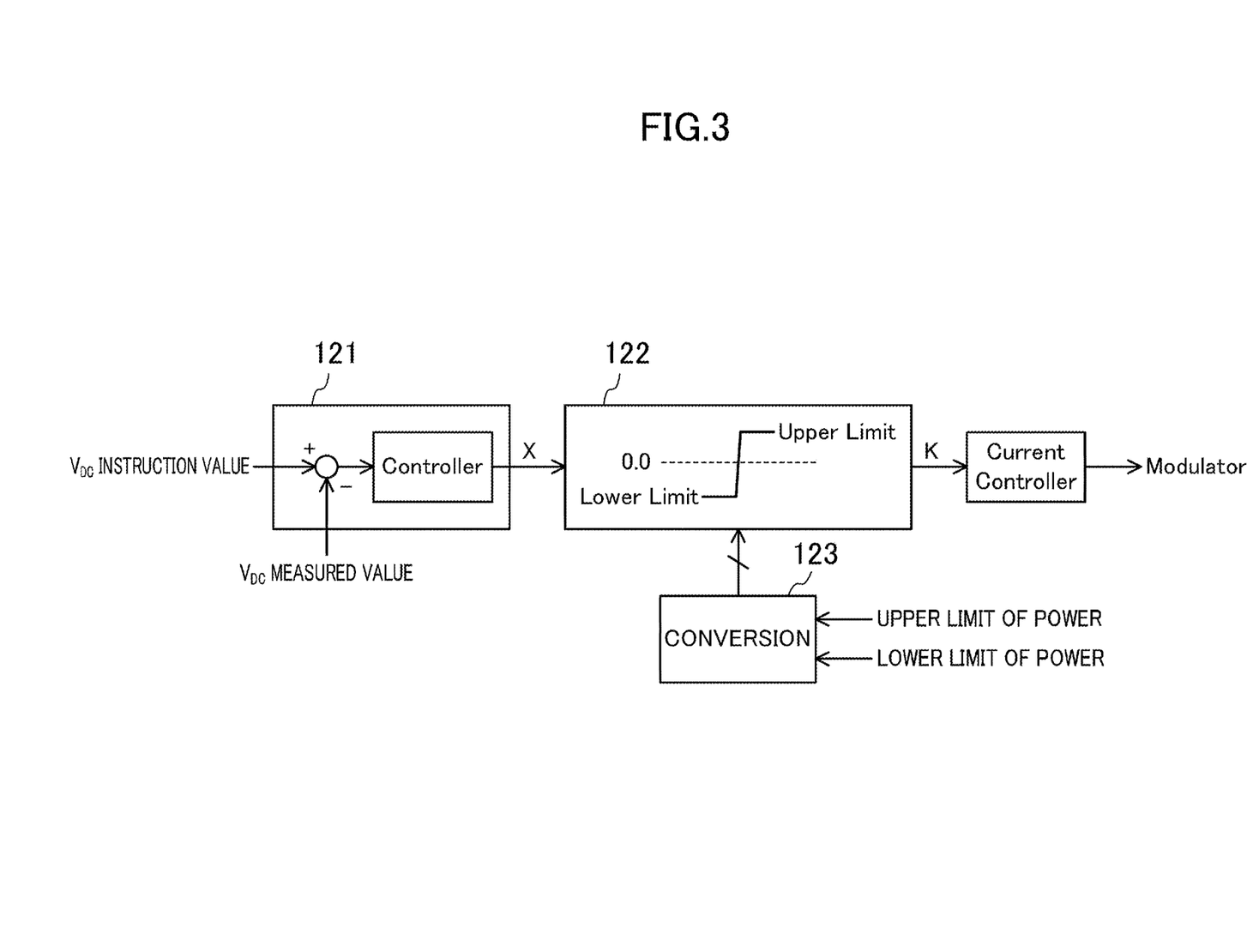
FIG. 3 is a control block diagram illustrating an example of scheme in which a battery unit controls the voltage of a DC link.

FIG. 3 is a control block diagram illustrating an example of scheme for controlling the voltage $V_{DC}$ of the DC link 21 in the unit controllers 12. Each of the battery units 10 has the control scheme of FIG. 3. As shown in FIG. 3, in this control scheme, a current determination part 121 compares the measured value of the voltage $V_{DC}$ of the DC link 21 with an instruction value and, based on the comparison result, generates a current command X indicating the charge/discharge current value of this battery unit 10. The current value indicated by the current command X means discharge operation when it is a positive value, and means charge operation when it is a negative value. The measured value is obtained by the voltage sensor provided in the unit controller 12, and the instruction value is sent from the controller 23.

A current restriction part 122 imposes a restriction on the current command X on both the discharge side (upper limit) and the charge side (lower limit). By a current command K after the restriction by the current restriction part 122, the charge/discharge current of this battery unit 10 is controlled. A restricted value conversion part 123 converts the upper limit value and lower limit value of the charge/discharge power of this battery unit 10 received from outside into the upper limit value and lower limit value of the current, and sends the converted results to the current restriction part 122. In this example, the upper and lower limit values of the charge/discharge power of this battery unit 10 are sent from the controller 23.

Figure 4:
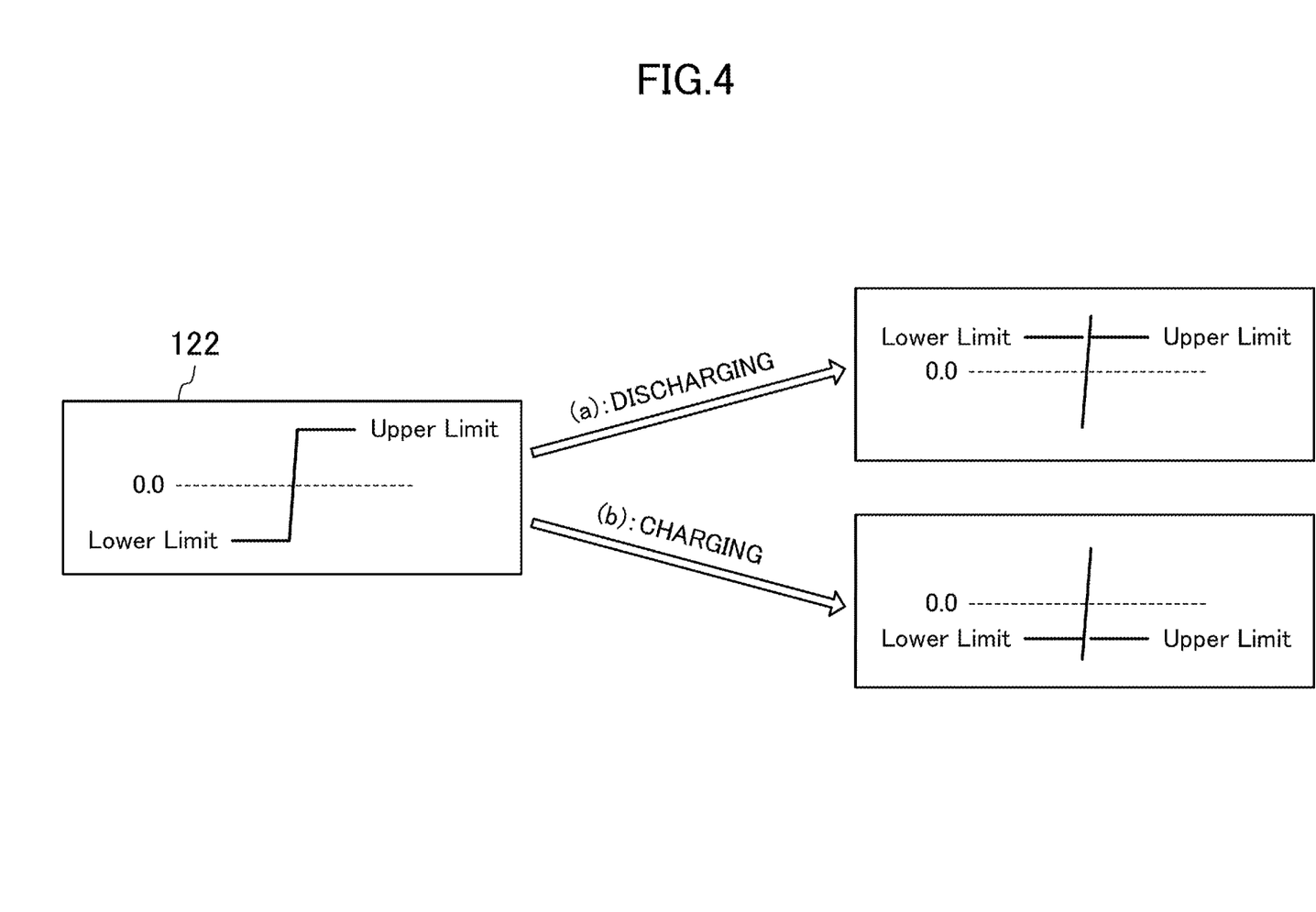
FIG. 4 is a view explaining a control of charging/discharging given electric power in the control scheme of FIG. 3.

With the control scheme of FIG. 3, not only the control of the voltage $V_{DC}$ of the DC link 21, but also control of charging/discharging given electric power to/from each battery unit 10 can be easily achieved. That is, as shown in FIG. 4, by setting a same current value as the upper and lower limit values in the current restriction part 122, the restricted current command K can be set at this current value. To state specifically, the upper and lower limit values in the current restriction part 122 may be set (a) at a same positive value when the battery unit 10 is to be discharged, or (b) at a same negative value when the battery unit 10 is to be charged.

In other words, the controller 23 sends a positive power value as the upper limit of the power value and a negative power value as the lower limit of the power value to the unit controller 12 of the battery unit 10 controlling the voltage $V_{DC}$ of the DC link 21. The restricted value conversion part 123 converts the received upper and lower limits of the power value into the upper and lower limits of the current value, and gives the results to the current restriction part 122. On the other hand, the controller 23 sends, to each of the other battery units 10, a same positive power value as the upper and lower limits of the power value when discharge is intended, or sends a same negative power value as the upper and lower limits of the power value when charge is intended. The restricted value conversion part 123 converts the received power value into a current value, and gives the result to the current restriction part 122. Thus, the current command K indicating the current corresponding to the same power value is output from the current restriction part 122. That is, given electric power can be charged/discharged into/from each of the other battery units 10.

As a result, by the control scheme of FIG. 3, it is possible to make the battery units 10 execute the charge/discharge operation for controlling the voltage VDC of the DC link 21 and, also the charge/discharge operation of given charge/discharge power, with a simple configuration.

Figure 5:
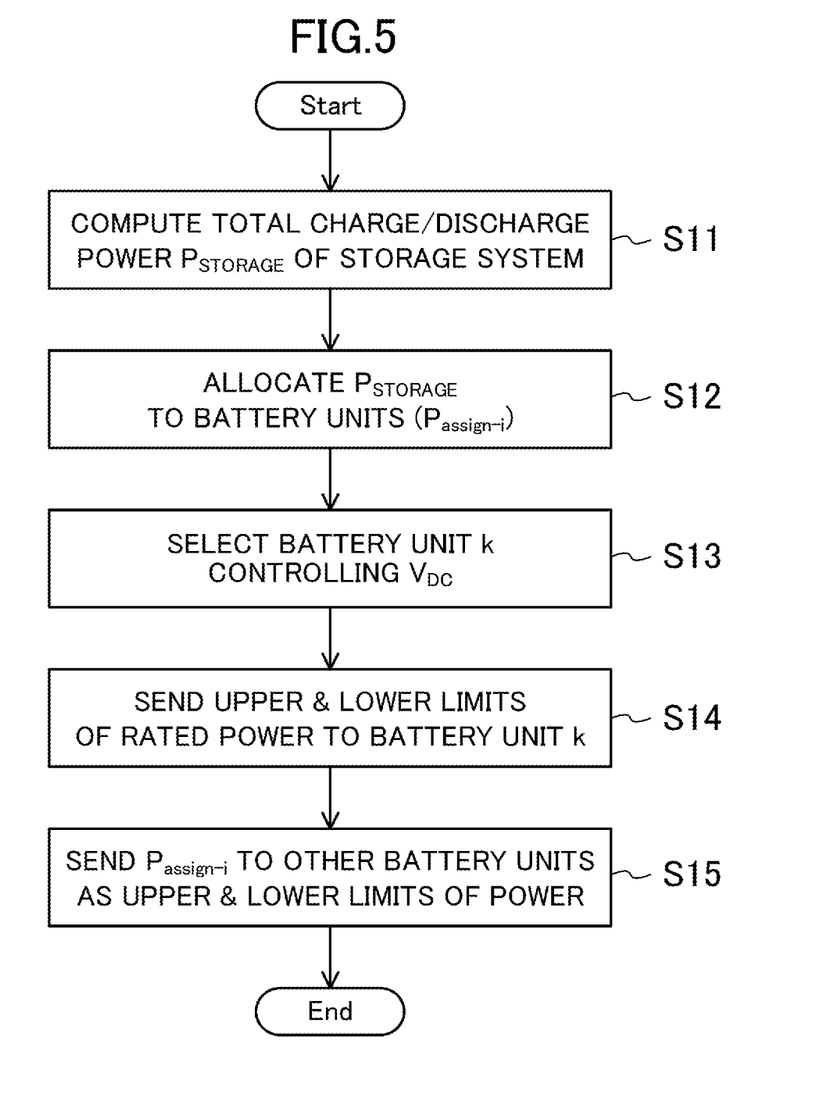
FIG. 5 is a flowchart showing an example of processing by a controller.

FIG. 5 is a flowchart showing an example of processing by the controller 23. The controller 23 executes the processing of FIG. 5 every given cycle. First, the total charge/discharge power $P_{STORAGE}$ of the storage system 1 is computed (S11). This computation may be performed by summing the present charge/discharge power values of the battery units 10 included in the storage system 1.

The controller 23 then allocates the total charge/discharge power $P_{STORAGE}$ of the storage system 1 to the battery units 10 (S12). The assigned power to each battery unit 10 is herein called power $P_{assign-i}$ (i is an integer from 1 to n, corresponding to the battery units 10-1 to 10-$n$).

Various methods can be thought of for the above power assignment. For example, power is assigned to the battery units 10 so that their state of charge (SOC) values are gradually close to the evenness. That is, when $P_{STORAGE}$ is a positive value, i.e., discharge power, large discharge power is assigned to a battery unit 10 large in SOC, and small discharge power is assigned to a battery unit 10 small in SOC. When $P_{STORAGE}$ is a negative value, i.e., charge power, small charge power is assigned to a battery unit 10 large in SOC, and large charge power is assigned to a battery unit 10 small in SOC. Other power assignment methods include, among others, a method using the state of health (SOH) value of the battery units 10, a method using the present charge/discharge power of the battery units 10, and a method using SOC, SOH, and the present charge/discharge power in combination.

The controller 23 then selects a battery unit (battery unit k) for controlling the voltage $V_{DC}$ of the DC link 21 among the battery units 10 (S13). This selection can be made using at least either one of parameters concerning the power and energy of the battery units 10. It is herein assumed that the parameter concerning the power refers to a power value related to the requested instruction value (set power value) and the parameter concerning the energy refers to SOC, for example.

Various methods can be thought of for the above selection. For example, the power capacity of each battery unit 10 may be used, the SOC thereof may be used, or both the power capacity and the SOC may be used. Specifically, the battery unit 10 largest in power capacity may be selected as the battery unit k. Otherwise, a battery unit 10 of which the SOC is near 50%, i.e., of which the remaining capacity is neither too large nor too small may be selected as the battery unit k. Alternatively, the power $P_{assign-i}$ assigned in step S12 may be used. Specifically, the battery unit 10 smallest in the absolute value of the power $P_{assign-i}$ assigned in step S12 may be selected as the battery unit k.

Otherwise, the selection may be made to avoid frequent changes of the battery unit k. Specifically, the selection of the battery unit k may be made every plurality of cycles.

The controller 23 then sends the upper and lower limits of the rated power to the selected battery unit k (S14). In the unit controller 12 of the battery unit k, the restricted value conversion part 123 converts the upper and lower limits of the rated power sent from the controller 23 into the upper and lower limit values of the current. The current restriction part 122 imposes a restriction on the current command using the upper and lower limit values of the current. In this way, the battery unit k can perform the charge/discharge operation for controlling the voltage $V_{DC}$ of the DC link 21.

The controller 23 also sends the power $P_{assign-i}$ assigned in step S12 to each of the battery units 10 other than the battery unit k as the upper and lower limit values of the power (S15). When the power $P_{assign-i}$ is a positive value, i.e., at the time of discharge, a positive current value obtained by converting the power $P_{assign-i}$ is set as the upper and lower limit values of the current in the current restriction part 122. In this way, the battery unit 10 can discharge the assigned power $P_{assign-i}$. When the power $P_{assign-i}$ is a negative value, i.e., at the time of charge, a negative current value obtained by converting the power $P_{assign-i}$ is set as the upper and lower limit values of the current in the current restriction part 122. In this way, the battery unit 10 can charge the assigned power $P_{assign-i}$.

Figure 6:
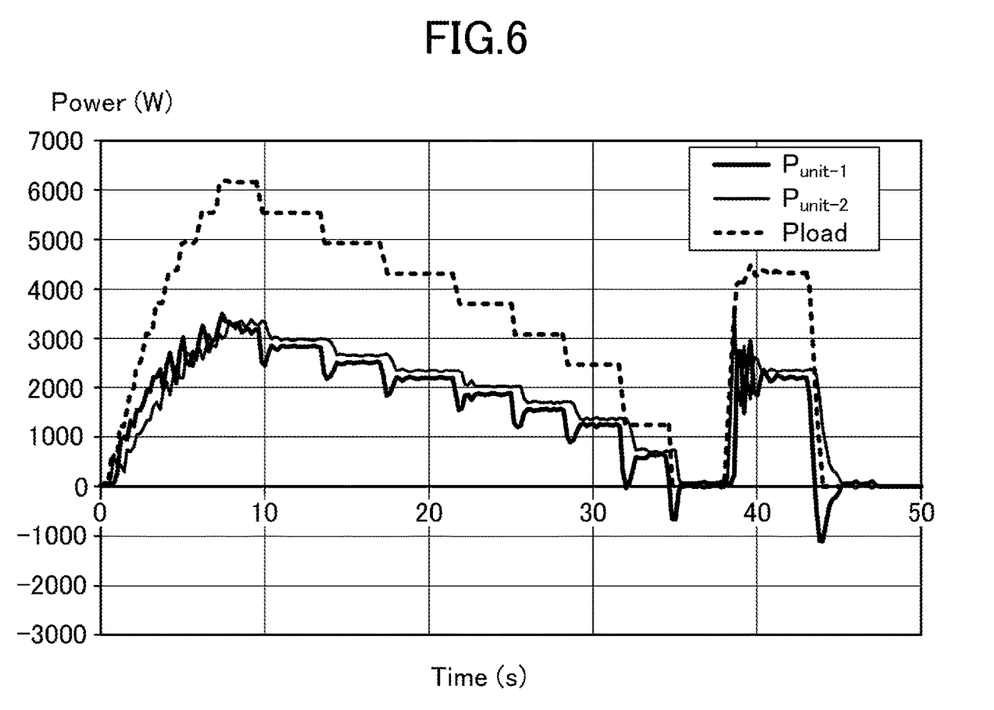
FIG. 6 is a graph showing the results of an experiment using the technique of the embodiment.

FIG. 6 is a graph showing the results of an experiment performed using the technique of this embodiment. In this experiment, a storage system having two battery units (unit 1, unit 2) was used. The unit 1 was selected as the battery unit controlling the voltage VDC of the DC link 21. The power consumption $P_{load}$ of a load was subjected to fluctuation, to plot resultant changes in the power $P_{unit-1}$ and $P_{unit-2}$ of the units 1 and 2. From FIG. 6, it is found that, as the power consumption $P_{load}$ of the load changes, the power $P_{unit-1}$ of the unit 1 abruptly changes. This abrupt change occurs in response to a sharp change in the voltage $V_{DC}$ of the DC link 21.

As described above, according to this embodiment, the power conditioner system includes the storage system 1 having a plurality of battery units 10. Each of the battery units 10 is connected to the inverter 22 through the DC link 21. Among the plurality of battery units 10, the battery unit 10-1, for example, is made to execute the charge/discharge operation for controlling the voltage $V_{DC}$ of the DC link 21. Therefore, even in the event that control of the voltage $V_{DC}$ of the DC link 21 by the inverter 22 becomes difficult, the voltage $V_{DC}$ of the DC link 21 can be stabilized by the charge/discharge operation of the battery unit 10-1. Also, since given charge/discharge power is assigned to each of the other battery units 10-2 to 10-n, the charge/discharge power of the entire storage system 1 can be properly managed. Thus, in the storage system 1 including a plurality of battery units 10, charge/discharge control for stabilizing the voltage $V_{DC}$ of the DC link 21 can be achieved.

Also, in this embodiment, the total charge/discharge power $P_{STORAGE}$ to be allocated to the storage system 1 is computed, and the computed total charge/discharge power $P_{STORAGE}$ is allocated to the battery units 10. Thereafter, a battery unit 10 executing charge/discharge operation for controlling the voltage $V_{DC}$ of the DC link 21 is selected among the plurality of battery units 10. With such processing, while the charge/discharge power of the entire storage system 1 is properly managed, the voltage $V_{DC}$ of the DC link 21 can be stabilized.

In this embodiment, the battery unit 10 executing the charge/discharge operation for controlling the voltage $V_{DC}$ of the DC link 21 is selected using at least either the power capacity or SOC of each battery unit. It is therefore possible to properly select the battery unit 10 executing the charge/discharge operation for controlling the voltage $V_{DC}$ of the DC link 21.

Also, by the control scheme of FIG. 3, it is possible to make the battery units 10 execute the charge/discharge operation for controlling the voltage $V_{DC}$ of the DC link 21, and also the charge/discharge operation of given charge/discharge power, with a simple configuration.

When the voltage $V_{DC}$ of the DC link 21 is largely changing, there may be a case where the voltage $V_{DC}$ cannot be properly controlled with only the selected battery unit 10. Considering such a case, an unselected battery unit 10 may be used to control the voltage $V_{DC}$ of the DC link 21 when the voltage $V_{DC}$ sharply changes.

Figure 7:
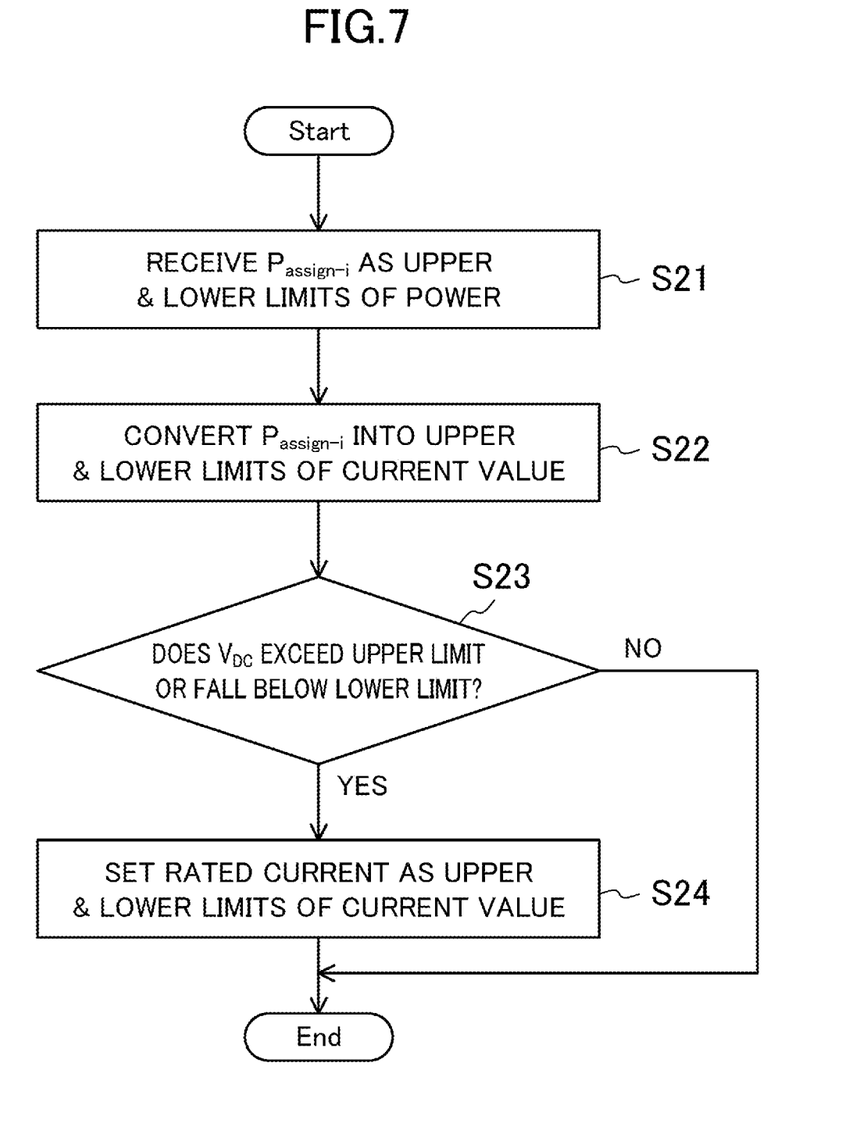
FIG. 7 is a flowchart showing an example of operation of a unit controller.

FIG. 7 is a flowchart showing an operation example of the unit controller 12. As shown in FIG. 7, the unit controller 12 receives the assigned power $P_{assign-i}$ from the controller 23 as the upper and lower limit values of the power (S21), and converts the power $P_{assign-i}$ into the upper and lower limits of the current value (S22). The operation so far is as described already.

The unit controller 12 then determines whether the voltage $V_{DC}$ of the DC link 21 exceeds a given upper limit value or falls below a given lower limit value (S23). If the voltage $V_{DC}$ is somewhere between the upper and lower limit values (NO in S23), the unit controller 12 does not change the setting of the upper and lower limit values of the current value. By contrast, if the voltage $V_{DC}$ exceeds the upper limit value or falls below the lower limit value (YES in S23), the unit controller 12 sets the upper and lower limits of the rated current as the upper and lower limits of the current value (S24). With this change of the setting, this battery unit 10 is permitted to perform the charge/discharge operation for controlling the voltage $V_{DC}$ of the DC link 21 although it is assigned with the power $P_{assign-i}$. Thus, the voltage $V_{DC}$ of the DC link 21 can be further stabilized.

While the number of battery units 10 performing the charge/discharge operation for controlling the voltage $V_{DC}$ of the DC link 21 is one in the above description, it is not limited to one. Two or more battery units 10 may be selected as battery units performing the charge/discharge operation for controlling the voltage $V_{DC}$ of the DC link 21.

The disclosed technology can be applied to Vehicle to Home (VtoH) system and Vehicle to Grid (VtoG) system. The battery units according to the present disclosure are applicable to, not only home-use batteries, but also batteries for industrial facilities and car-mounted batteries (for power trains).

What is claimed is:

1. A method for controlling charge/discharge of a plurality of battery units in a power conditioner system, the power conditioner system including a storage system having the plurality of battery units, and a power conditioner having a DC link, an inverter and a controller, the plurality of battery units each connected to the inverter through the DC link, wherein
 a distributed power supply is connected to the DC link, and
 the method, by the controller, comprising:
  computing total charge/discharge power to be allocated to the storage system, using output power of the distributed power supply and output power of the power conditioner, including:
   computing total charge power to be allocated to the storage system as a surplus power when output power of the distributed power supply is greater than output power of the power conditioner, wherein the surplus power is a positive power computed as the output power of the distributed power supply less the output power of the power conditioner; or
   computing total discharge power to be allocated to the storage system as a shortage of power when output power of the distributed power supply is less than output power of the power conditioner, wherein the shortage of power is a negative power computed as the output power of the distributed power supply less the output power of the power conditioner;
  allocating the computed total charge/discharge power to the battery units;
  selecting, among the plurality of battery units, at least one first battery unit that executes charge/discharge operation for controlling a voltage of the DC link, making the first battery unit execute the charge/discharge operation for controlling the voltage of the DC link; and making every battery unit other than the first battery unit execute charge/discharge operation with given charge/discharge power.

2. The method of claim 1, wherein
the selection of the first battery unit is performed using at least either one of parameters concerning power and energy of the battery units.

3. The method of claim 1, wherein
a battery unit other than the first battery unit is made to execute the charge/discharge operation for controlling the voltage of the DC link when the voltage of the DC link exceeds a given upper limit value or falls below a given lower limit value.

\* \* \* \* \*